(12) United States Patent
Bedell et al.

(10) Patent No.: US 8,397,371 B2
(45) Date of Patent: Mar. 19, 2013

(54) PROCESS OF MANUFACTURING LOW RESISTANCE DAMASCENE COILS

(75) Inventors: Daniel Wayne Bedell, Gilroy, CA (US); David Patrick Druist, Santa Clara, CA (US); Edward Hin Pong Lee, San Jose, CA (US); Jennifer Ai-Ming Loo, Fremont, CA (US); Vladimir Nikitin, Campbell, CA (US); Sue Siyang Zhang, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 293 days.

(21) Appl. No.: 12/707,652

(22) Filed: Feb. 17, 2010

(65) Prior Publication Data
US 2010/0163523 A1  Jul. 1, 2010

Related U.S. Application Data (62) Division of application No. 11/644,446, filed on Dec. 22, 2006, now Pat. No. 7,729,084.

(51) Int. Cl.
*G11B 5/17* (2006.01)
*G11B 5/187* (2006.01)

(52) U.S. Cl. ............... 29/603.23; 29/603.25; 29/603.13; 427/116; 427/526; 430/313

(58) Field of Classification Search ............... 29/603.07, 29/603.13, 603.23, 603.25; 430/313, 328, 430/329; 427/116, 526; 360/123.19, 123.02, 360/125.25, 125.5; 216/66, 88
See application file for complete search history.

(56) References Cited

U.S. PATENT DOCUMENTS

| | | | |
|---|---|---|---|
| 4,243,744 A * | 1/1981 | Lockwood et al. | 430/328 X |
| 4,648,087 A | 3/1987 | Scranton et al. | |
| 4,684,438 A | 8/1987 | Lazzari | |
| 6,487,044 B1 | 11/2002 | Honda | |
| 6,680,164 B2 * | 1/2004 | Nguyen et al. | 430/329 |
| 6,696,226 B1 * | 2/2004 | Dinan et al. | 29/603.25 X |
| 6,948,231 B2 * | 9/2005 | Hsiao et al. | 29/603.25 |
| 2001/0040763 A1 | 11/2001 | Sasaki | |
| 2004/0080867 A1 | 4/2004 | Han et al. | |
| 2004/0100728 A1 | 5/2004 | Sato et al. | |
| 2005/0189319 A1 * | 9/2005 | Guthrie et al. | 216/88 X |

FOREIGN PATENT DOCUMENTS

JP  2004146045 A  *  5/2004

* cited by examiner

*Primary Examiner* — A. Dexter Tugbang
(74) *Attorney, Agent, or Firm* — Maryam Imam; IPxLAW Group LLP (57) ABSTRACT

In one embodiment and method of the present invention, a coil of a write head is created by forming a P1 pedestal layer and a back gap layer and further forming a coil pattern consistent with the coil to be formed and insulator spacers dispersed in the coil pattern, using a non-damascene process, thereafter the coil is formed by plating using a damascene process.

13 Claims, 14 Drawing Sheets

PROCESS OF MANUFACTURING LOW RESISTANCE DAMASCENE COILS

CROSS REFERENCE TO RELATED APPLICATIONS

This application is a divisional application of U.S. patent application Ser. No. 11/644,446, filed on Dec. 22, 2006, entitled "FORMATION OF LOW RESISTANCE DAMASCENE COILS".

BACKGROUND OF THE INVENTION

1. Field of the Invention

This invention relates in general to the manufacture and structure of magnetic heads, and more particularly to a method for forming a coil with higher copper density in the magnetic head using a process combining damascene and non-damascene processes.

2. Description of the Prior Art

In the last decades, magnetic hard drives (or disc drives) have been in common use for storage of large groups of data. Improvements in manufacturing thereof have attracted popular attention particularly to reducing the size of the drive and/or its internal components to achieve both lower costs and wider applications.

Magnetic hard drives include magnetic recording head for reading and writing of data. As well known, a magnetic recording head generally includes two portions, a write head portion or head for writing or programming magnetically-encoded information on a magnetic media or disc and a reader portion for reading or retrieving the stored information from the media.

Data is written onto a disc by a write head that includes a magnetic yoke having a coil passing there through. When current flows through the coil, a magnetic flux is induced in the yoke, which causes a magnetic field to fringe out at a write gap in a pole tip region. It is this magnetic field that writes data, in the form of magnetic transitions, onto the disk. Currently, such heads are thin film magnetic heads, constructed using material deposition techniques such as sputtering and electroplating, along with photolithographic techniques, and wet and dry etching techniques.

Examples of such thin film heads include a first magnetic pole, formed of a material such as NiFe which might be plated onto a substrate after sputter depositing an electrically conductive seed layer. Opposite the pole tip region, at a back end of the magnetic pole, a magnetic back gap can be formed. A back gap is the term generally used to describe a magnetic structure that magnetically connects first and second poles to form a completed magnetic yoke.

One or more electrically conductive coils can be formed over the first pole, between the pedestal and the back gap and can be electrically isolated from the pole and yoke by an insulation layer (or insulator spacers or insulators), which could be alumina ($Al_2O_3$) or hard baked photoresist.

In operation, the disk (or disc) rotates on a spindle controlled by a drive motor and the magnetic read/write head is attached to a slider supported above the disk by an actuator arm. When the disk rotates at high speed a cushion of moving air is formed lifting the air bearing surface (ABS) of the magnetic read/write head above the surface of the disk.

As disk drive technology progresses, more data is compressed into smaller areas. Increasing data density is dependent upon read/write heads fabricated with smaller geometries capable of magnetizing or sensing the magnetization of correspondingly smaller areas on the magnetic disk. The advance in magnetic head technology has led to heads fabricated using processes similar to those used in the manufacture of semiconductor devices.

The read portion of the head is typically formed using a magnetoresistive (MR) element. This element is a layered structure with one or more layers of material exhibiting the magnetoresistive effect. The resistance of a magnetoresistive element changes when the element is in the presence of a magnetic field. Data bits are stored on the disk as small, magnetized region on the disk. As the disk passes by beneath the surface of the magnetoresistive material in the read head, the resistance of the material changes and this change is sensed by the disk drive control circuitry.

The write portion of a read/write head is typically fabricated using a coil embedded in an insulator between a top and bottom magnetic layer. The magnetic layers are arranged as a magnetic circuit, with pole tips forming a magnetic gap at the air bearing surface (ABS) of the head. When a data bit is to be written to the disk, the disk drive circuitry sends current through the coil creating a magnetic flux. The magnetic layers provide a path for the flux and a magnetic field generated at the pole tips magnetizes a small portion of the magnetic disk, thereby storing a data bit on the disk.

Stated differently, data is written onto a disk by a write head that includes a magnetic yoke having a coil passing therethrough. When current flows through the coil, a magnetic flux is induced in the yoke, which causes a magnetic field to fringe out at a write gap in a pole tip region. It is this magnetic field that writes data or data bits, in the form of magnetic transitions, onto the disk. Such heads are typically thin film magnetic heads, constructed using material deposition techniques such as sputtering and electroplating, along with photolithographic techniques and wet and dry etching techniques.

The read/write head is formed by deposition of magnetic, insulating and conductive layers using a variety of techniques. Fabrication of the write head coil requires a metallization step wherein the metallization is formed in the shape of a coil. The damascene process is one of the techniques used for forming metallization layers in integrated circuits. Generally, the damascene process involves forming grooves or trenches in a material, and then electroplating to fill the trenches with metal. After a trench is formed, however, a seed layer must first be deposited in the trench to provide an electrically conductive path for the ensuing electrodeposition process. Metal is then deposited over the entire area so that the trench is completely filled.

The damascene process used in semiconductor device fabrication requires fewer process steps compared to other metallization technologies. To achieve optimum adherence of the conductor to the sides of the trench, the seed layer deposited prior to deposition of the metal must be continuous and essentially uniform.

The increasing demand for higher data rate has correspondingly fueled the reduction of the yoke length, coil pitch and hence the overall head structure. This allows for higher speeds (rpm) disk drives having high performance. In addition to a compact design of the yoke (shorter yoke), low coil resistance is desirable for which damascene techniques are used to form a thick coil in a compact area. Additionally, more copper or coil is desirable to reduce coil resistance, which reduces write-induced protrusion. Write-induced protrusion occurs during writing to the disk because when temperature increases as a result of hotter coils, it causes the write head to expand and come in contact with the disk. Any such contact with the disk is clearly highly undesirable because of the damage caused to the disk. Thus, there is a need to decrease coil resistance.

In damascene techniques, hard baked photoresist is used as a medium, onto which coil is formed. However, fairly large spaces are present in between coil turns in current coil manufacturing techniques. The spaces are typically filled with baked photoresist and are basically thick insulator walls. For example, a typical thickness of the insulator wall is 300 nanometers. Since coil resistance for Damascene coilds is determined by how thick the insulator walls are and how tall the coil turns are, thick insulator wall reduces copper density and causes higher coil resistance.

Briefly, in current manufacturing techniques, the photoresist material is baked and exposed to create holes and then when copper is plated in the holes to form coil(s) thereupon. The photoresist material is then either removed or left in. Damascene techniques allow for higher aspect ratio and therefore lower resistance, nevertheless, in current techniques, the fairly large spaces between the coil turns prevent attaining even lower resistance. In non-damascene techniques, the seed layer is deposited prior to the photoresist material but higher aspect ratios are again unattainable due to the presence of thick insulator walls.

Another advantage of reducing spaces that are other than copper is to lower write head expansion at an elevated temperature. That is, photoresist having a large coefficient of thermal expansion benefits from reduced volume because temperature-induced protrusion is then reduced.

Figure 1:
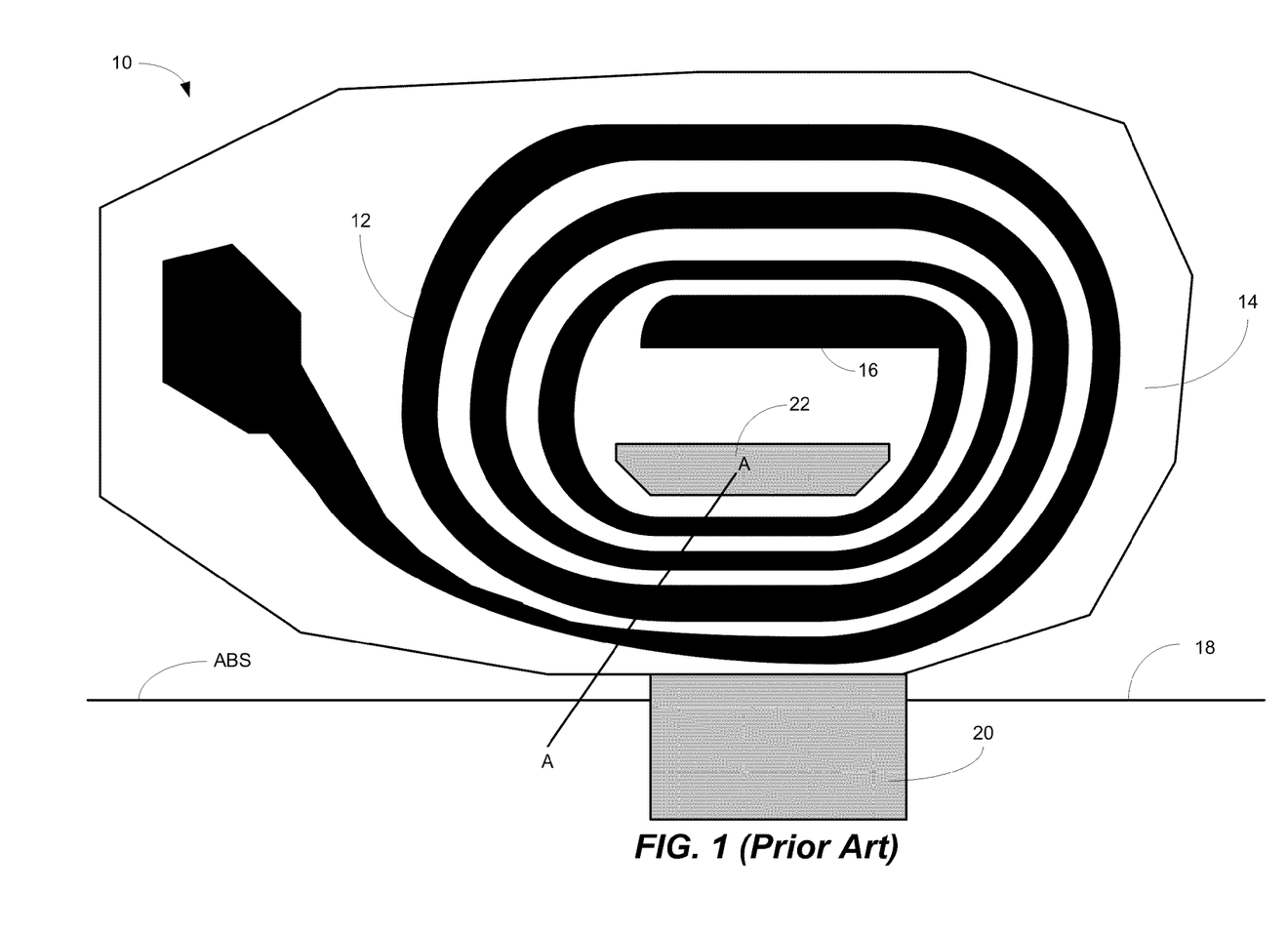
FIG. 1 shows relevant portions of a prior art disk drive 10.

By way of brief background, in FIG. 1, relevant portions of a prior art disk drive 10 is shown to include a photoresist 14 onto which a coil 12 is formed having a center tap 16. A P1 pedestal layer 20 is shown formed below the bottom of the photoresist 14 at the ABS 18. A back gap layer 22 is shown below the center tap 16 surrounded by the coil 12. In fact, the coil 12 is formed between the P1 pedestal layer 20 and the back gap layer 22 forming a yoke.

Figure 2:
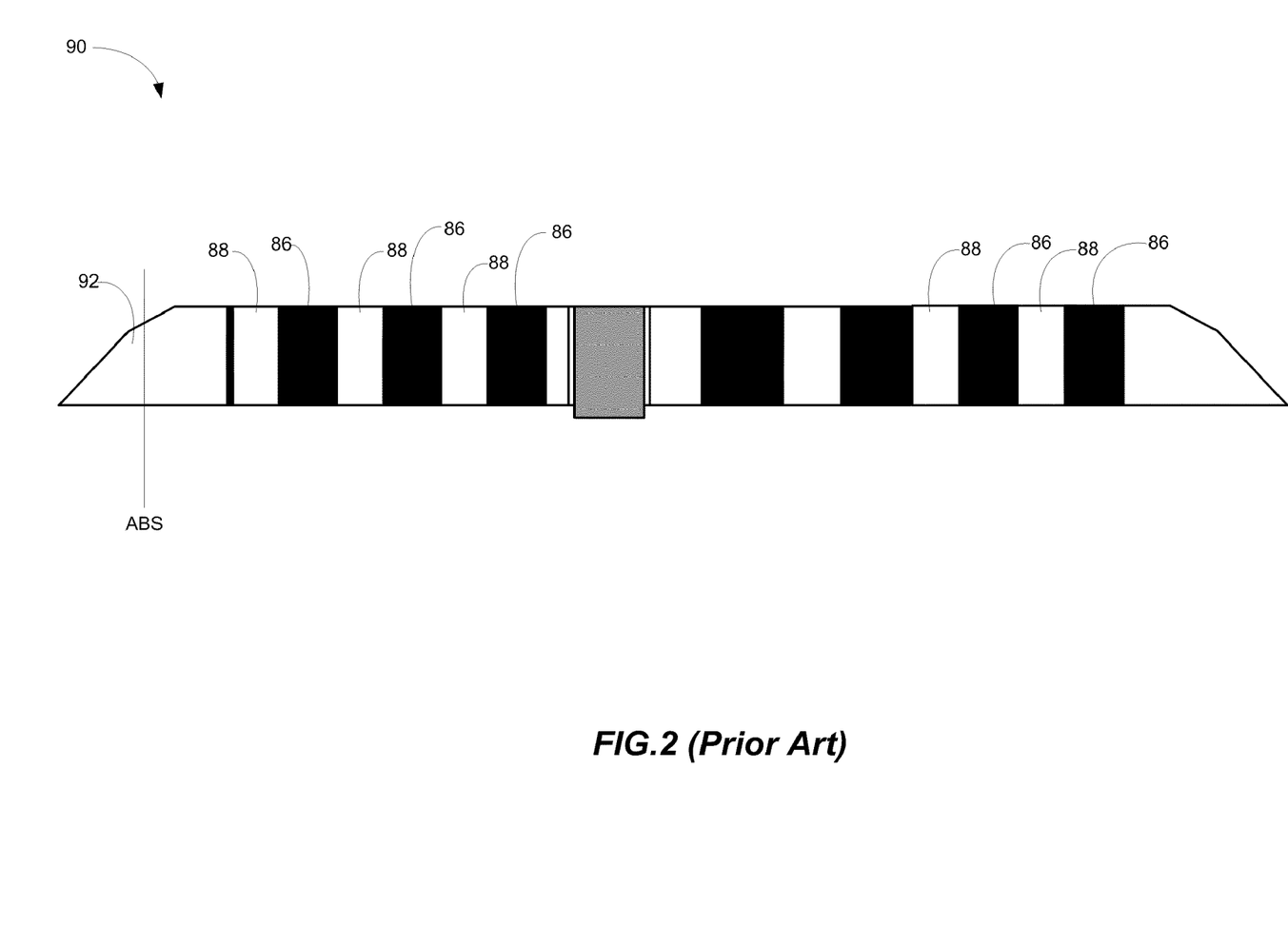
FIG. 2 shows a cross section view of the prior art disk drive 10, at AA of FIG. 1.

It is desirable to decrease the photoresist 14 and increase the coil 12 for the foregoing reasons, among others. In FIG. 2, a cross sectional view, at AA, of the disk drive 10 of FIG. 1, is shown at 90. Coil turns 86 form the coil 12 of FIG. 1 and the insulators (or spaces) 88 shown between the coil turns 86 form the photoresist 14 of FIG. 1. A first pole P1 is shown on top of which is disposed the back gap layer 22, the coil turns 86, which are relatively small in size, and the insulators 88, which are relatively large in size therefore causing disk drive performance issues, such as write-induced and temperature protrusion.

Thus, there is a need for forming a coil having more copper and less insulation space between coil turns in a compact area of a magnetic head using damascene and non-damascene processes.

SUMMARY OF THE INVENTION

To overcome the limitations in the prior art described above, and to overcome other limitations that will become apparent upon reading and understanding the present specification, the present invention discloses a method and a corresponding structure for forming a coil in a compact area using a combination of non-damascene and damascene processes.

The present invention solves the above-described problem(s) by providing, in one embodiment of the present invention, a write head including a P1 pedestal layer, a back gap layer, coil patterns formed between the P1 pedestal layer and the back gap layer, and spacers formed between the coil patterns and copper plated on the P1 pedestal layer and the back gap layer to form a coil with increased copper of at least a factor of two over that of known techniques.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of embodiments of the present invention.

BRIEF DESCRIPTION OF THE DRAWINGS

Referring now to the drawings in which like reference numbers represent corresponding parts throughout.

DETAILED DESCRIPTION OF THE EMBODIMENTS OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides an apparatus and method for forming a coil in a compact area of a magnetic head using non-damascene and damascene processes. During the non-damascene process, between a P1 pedestal layer and a back gap layer of the magnetic recording (or write) head, coil is formed by first forming a coil pattern consistent with the shape of the coil that will be formed. Insulator spacers dispersed in the coil patterns are thin and allow for a greater area for the coil to be formed. The damascene process is used for plating the copper to form the coil. This also results in thick coil formed in a compact area and having lower resistance. Additionally, in conventional single pancake coil designs, a connector layer, in the form of a jumper, is used to connect a first and second coil turns forcing current to flow in only one direction.

Figure 3:
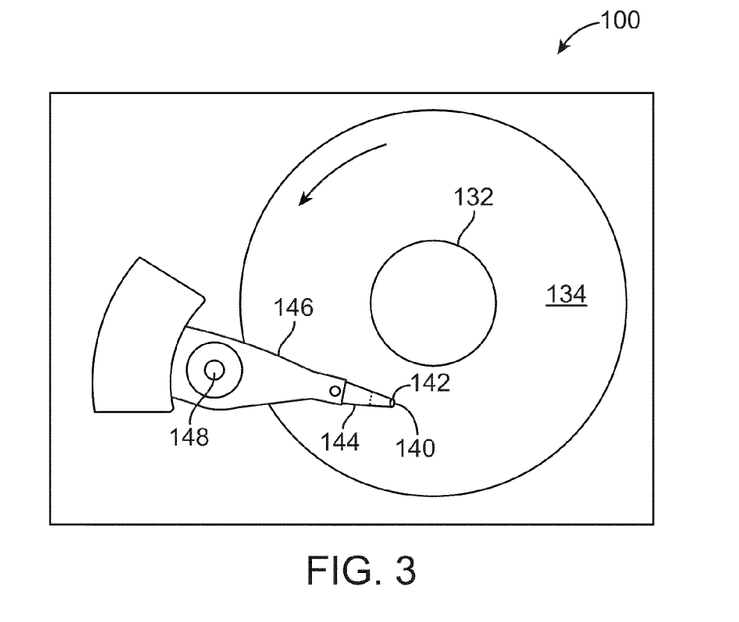
FIG. 3 illustrates a storage system according to the present invention.

FIG. 3 illustrates a storage system 100 according to the present invention. In FIG. 3, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 4:
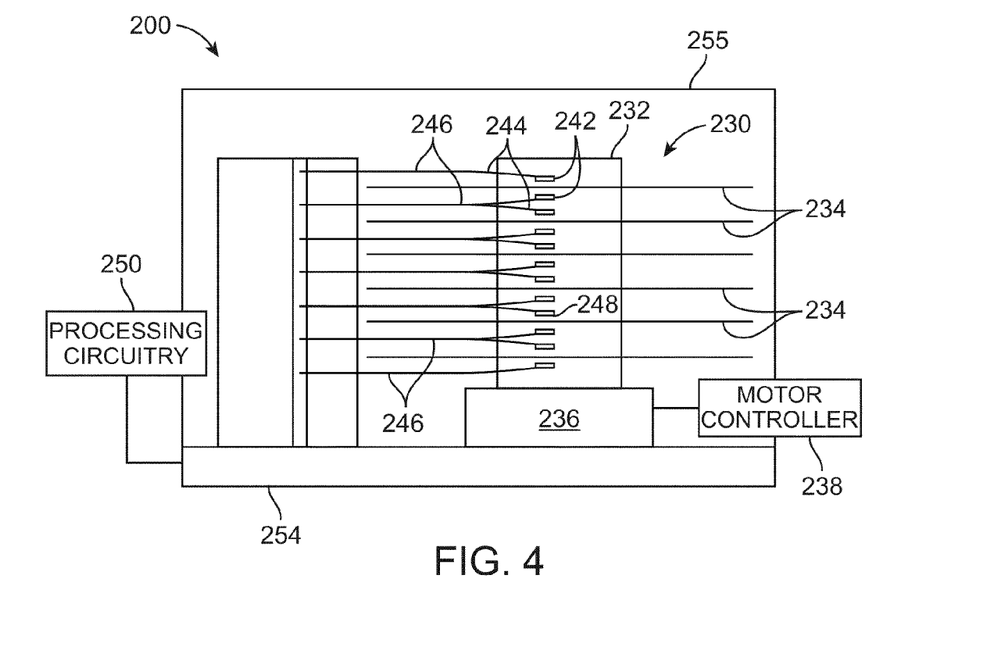
FIG. 4 illustrates one particular embodiment of a storage system according to the present invention.

FIG. 4 illustrates one particular embodiment of a storage system 200 according to the present invention. In FIG. 4, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air bearing surface (ABS) 248. The magnetic head may then be employed for writing information to multiple circular tracks on the surface of the disk 234, as well as for reading information therefrom.

Figure 5:
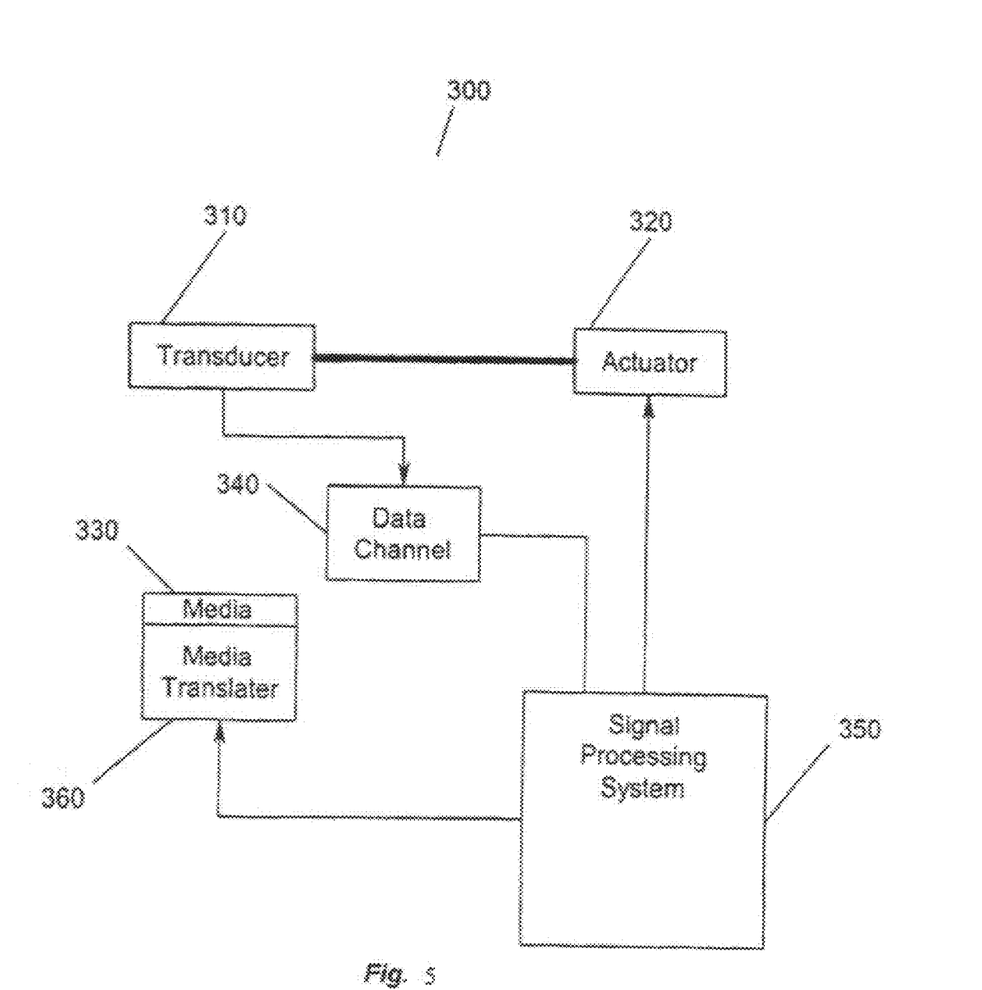
FIG. 5 illustrates a disk drive system according to the present invention.

FIG. 5 illustrates a storage system 300. In FIG. 5, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

Figure 6:
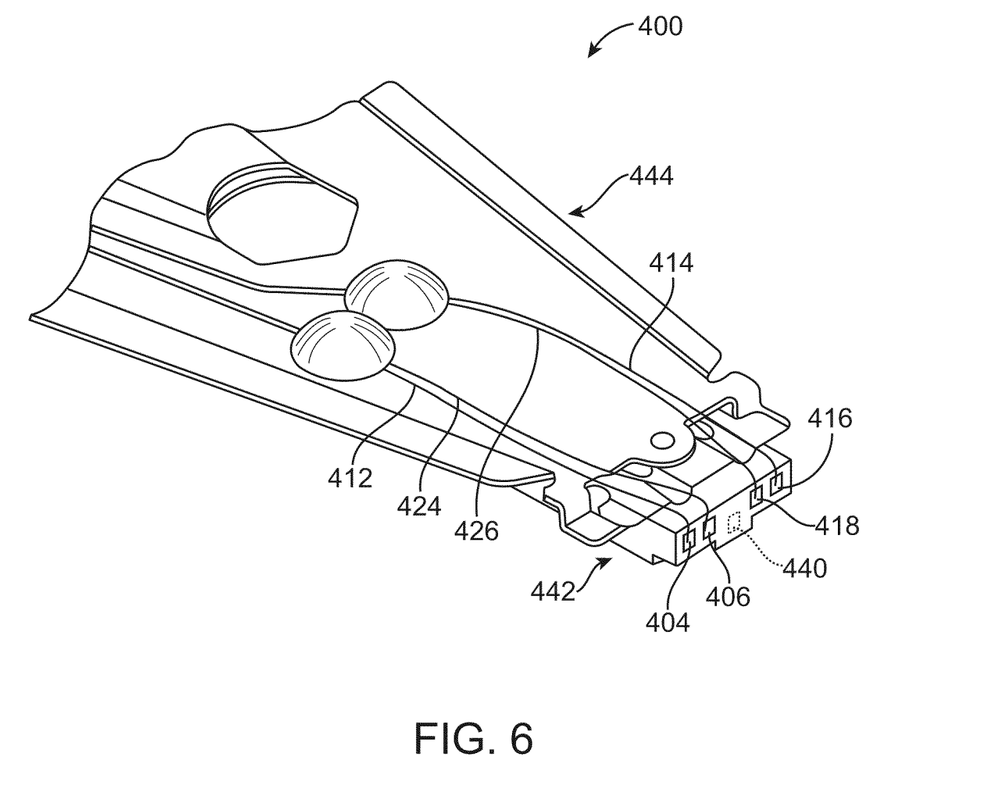
FIG. 6 is an isometric illustration of a suspension system for supporting a slider and a magnetic head.

FIG. 6 is an isometric illustration of a suspension system 400 for supporting a slider 442 having a magnetic head mounted thereto. In FIG. 6, first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

Figure 7:
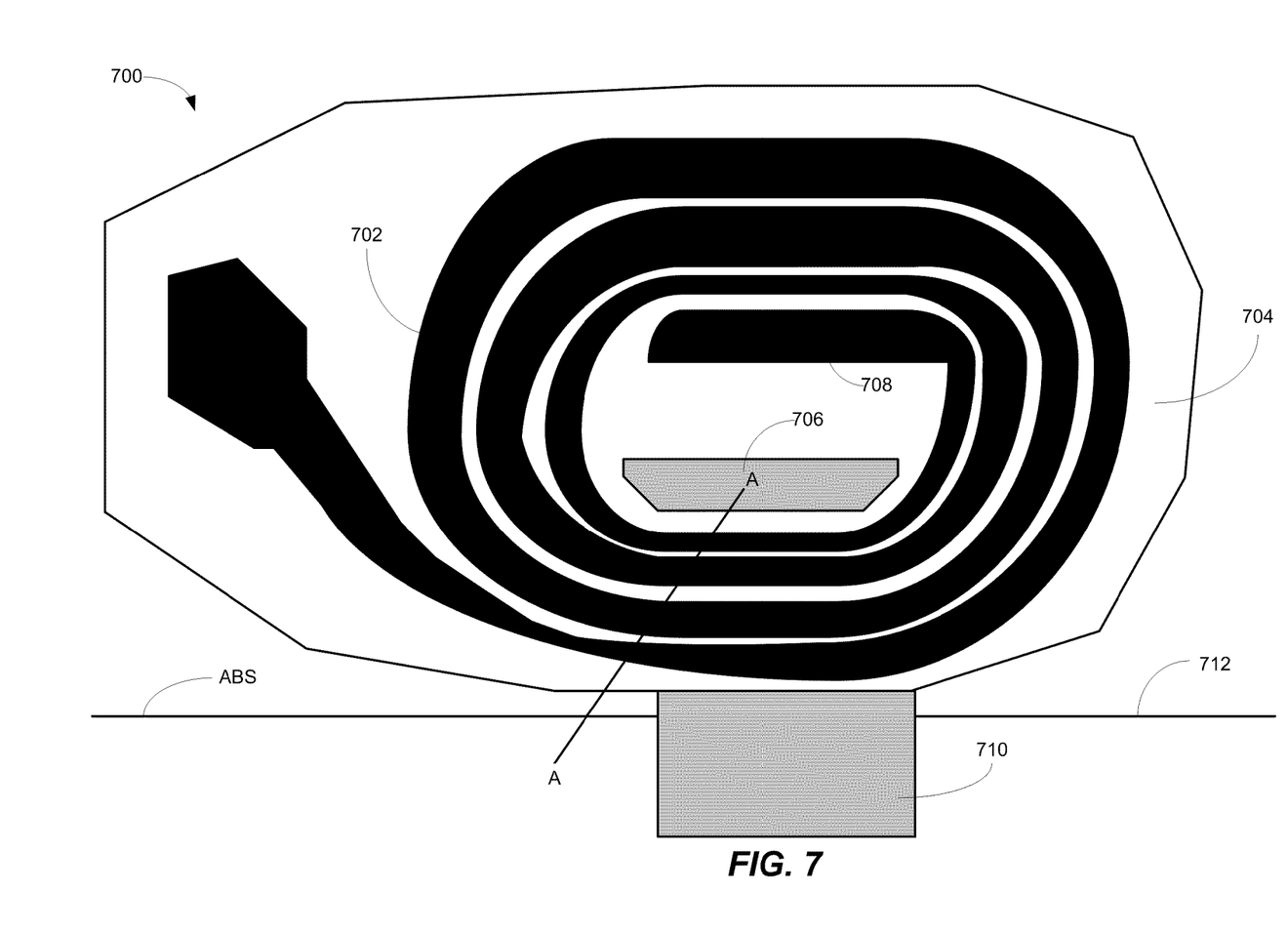
FIG. 7 illustrates a top view of the relevant portions of the write head 700 of the hard disk drive 230 of FIG. 4, in accordance with an embodiment of the present invention.

FIG. 7 illustrates a top view of the relevant portions of the write head 700 of the hard disk drive 230 of FIG. 4, in accordance with an embodiment of the present invention. To provide perspective, the write head 700 is a part of the slider referred to and discussed in FIGS. 3-6, operational in a disk drive, such as the hard disk drive 230. FIG. 7 shows a coil 702 formed between a P1 pedestal layer 710 and a back gap layer 706. A hard bake photoresist 704 isolates the coil windings of the coil 702. The coil 702 includes a center tap 708 at its inner-most winding and disposed on top of the back gap layer 706. The P1 pedestal 710 on top of which the hard bake photoresist 704 is disposed is shown at an ABS 712. The coil 702 is shown to have more copper and the photoresist 704 is shown to occupy less space creating thinner insulator walls relative to prior art structures. It is believed that the aspect ratio of the embodiments of the present invention is at least 40:1, which is an improvement of two times over that of the prior art.

Figure 8A:
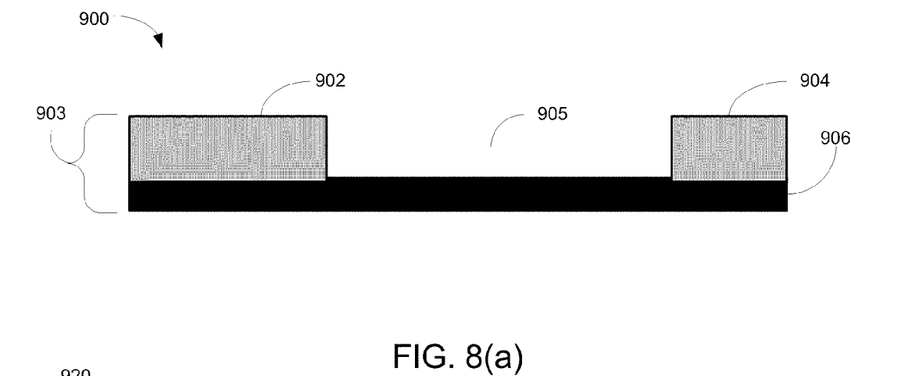
FIGS. 8(a)-(j) illustrate the method for patterning a coil in accordance with the methods and embodiments of the present invention.

FIGS. 8(a)-(j) illustrate the method for patterning a coil in accordance with the methods and embodiments of the present invention. In FIG. 8(a), a portion of a magnetic transducer 900 is shown to include a write head 903. The write head 903 is shown to include a first pole P1 906 above which a P1 pedestal layer 902 is shown formed on a front end and a back gap layer 904 on an opposing or back end of the transducer 900. A gap 905 is shown to be the top part of the P1 906 onto which no layer is yet formed and thus separates the P1 pedestal layer 902 and the back gap layer 904.

The P1 pedestal layer 902 is built by placing a layer of metal across an entire wafer, then, a photolithography pattern is performed to provide the shapes of, for example, the P1 pedestal layer 902, and then, the pattern is placed in an electroplating bath and then plating is performed to remove areas where the photoresist is not open. In other words, in the places where the photoresist is present, no plating is performed whereas in areas where the photoresist is not present, plating results. Next, the photoresist is stripped away using solvents and then plasma etching is performed, bombarding the surface, to remove the metal material that remained unplated. The result is the P1 pedestal layer 902 shown in FIG. 8(a).

Figure 8B:
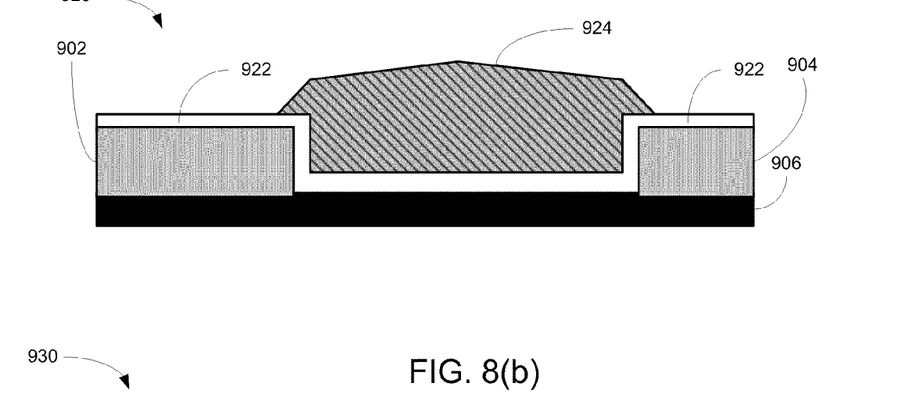
Figure 8C:
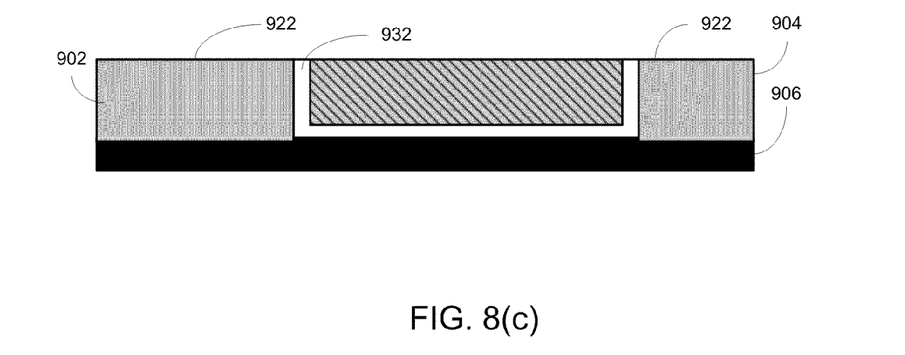

FIG. 8(b) shows the step 920 of depositing a first non-magnetic, non-conductive material 922, such as $Al_2O_3$, in the gap 905 between the back gap layer 904 and the P1 pedestal layer 902. A hard bake photoresist 924 (of FIG. 8(b)), is deposited to fill the gap 905 (of FIG. 8(a)) and above the layer 922 and it is cured by baking. Next, in FIG. 8(c) at step 930, the hard bake photoresist 924 (of FIG. 8(b)) is polished via Chemical Mechanical Planarization (CMP) to the height 932 of the first non-magnetic, non-conductive material 922 on the P1 pedestal layer 902 and back gap layer 904.

CMP is the process by which a surface is made even by removal of material from any uneven topography. As its name indicates, CMP is a combination of a mechanical polishing with a chemistry that includes abrasives and either an acid or base to achieve the desired effects.

Alumina filling is performed because photoresist is patterned in only certain areas, thus, the areas that are not patterned, are filled with other material, such as alumina ($Al_2O_3$). Polishing the entire surface flat as is done by CMP, a two-dimensional area is created in which coil is formed, as the coil must be formed on photoresist and cannot be formed on alumina because it simply will not form.

Figure 8D:
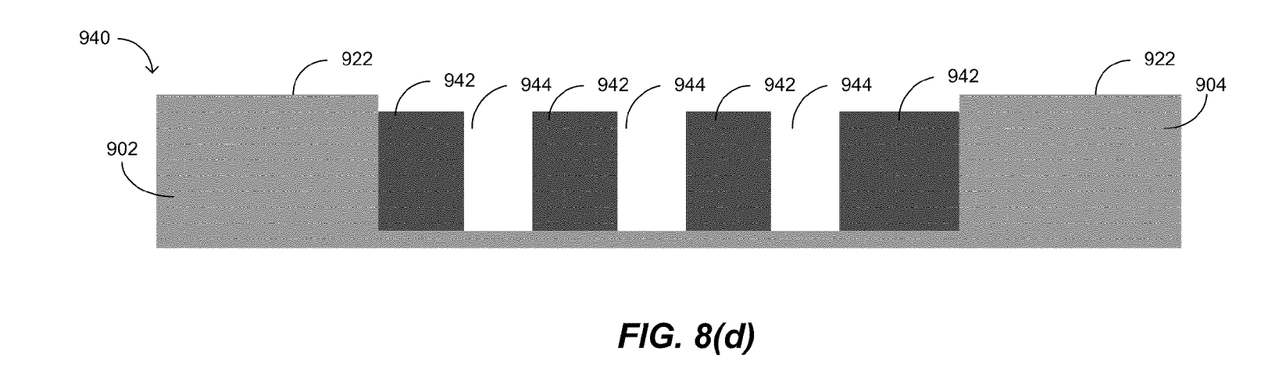

Next, at step 940, in FIG. 8(d), coil pattern 944 is created in thick photoresist forming the photoresist 942. This is done by performing a reactive ion etching (RIE) to etch the coil pattern from the photo stencil into a hard baked photoresist. Thus, after the step 940, coil photo pattern is formed in thick photoresist.

Figure 8E:
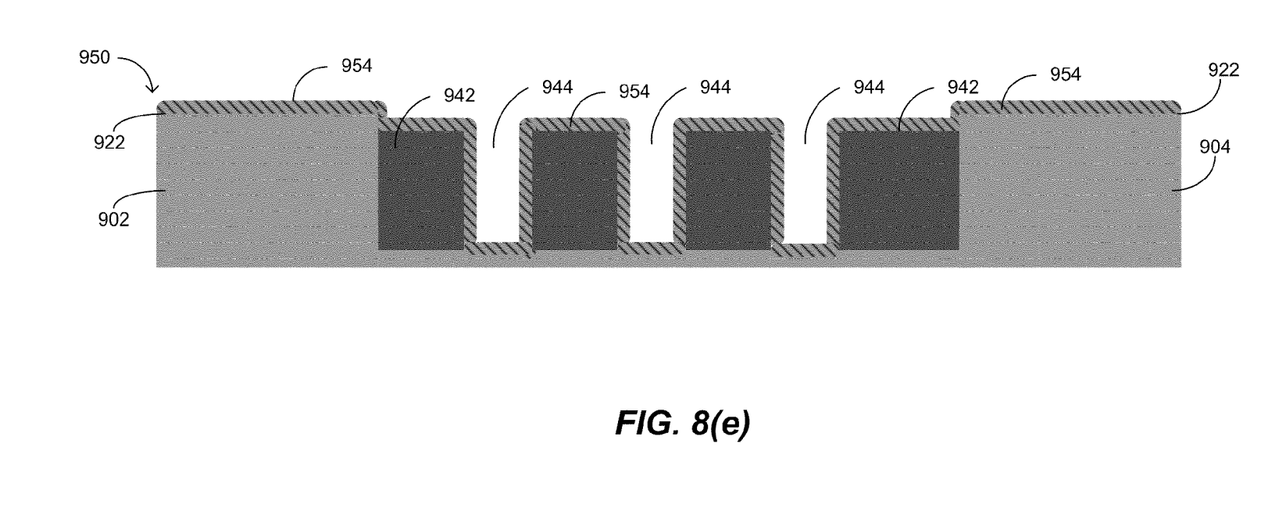

Next, at step 950, in FIG. 8(e), an insulator layer 954 is deposited over the P1 pedestal layer 902, the back gap layer 904, the layer 922, the coil pattern 944 and the photoresist 942. The insulating layer 954 needs to have high insulation properties, and preferably has high mechanical strength. Examplary materials of which the layer 954 can be made are alumina ($Al_2O_3$), silicon oxide ($SiO_2$), and silicon nitrade ($Si_3N_4$). The layer 954 is conformal in that the thickness of the layer 954 that is located on top of the photoresist 942 is substantially the same as that which is located on the side of the photoresist 942 which is substantially the same as that which is located on the bottom of the coil pattern 944. This is important to ensure that sufficient amounts of the layer 954 are deposited on the side of the photoresist 942, which ultimately form the spacers between the coils, as will become evident shortly. Examples of materials used as the layer 954 include but are not limited to $SiO_2$, alumina and SiO. All of these materials are known to be sturdy. $SiO_2$ is formed using a process known as plasma enhanced chemical vapor deposition (PECVD) and alumina or $Al_2O_2$ is formed using a process known as atomic layer deposition (ALD).

Figure 8F:
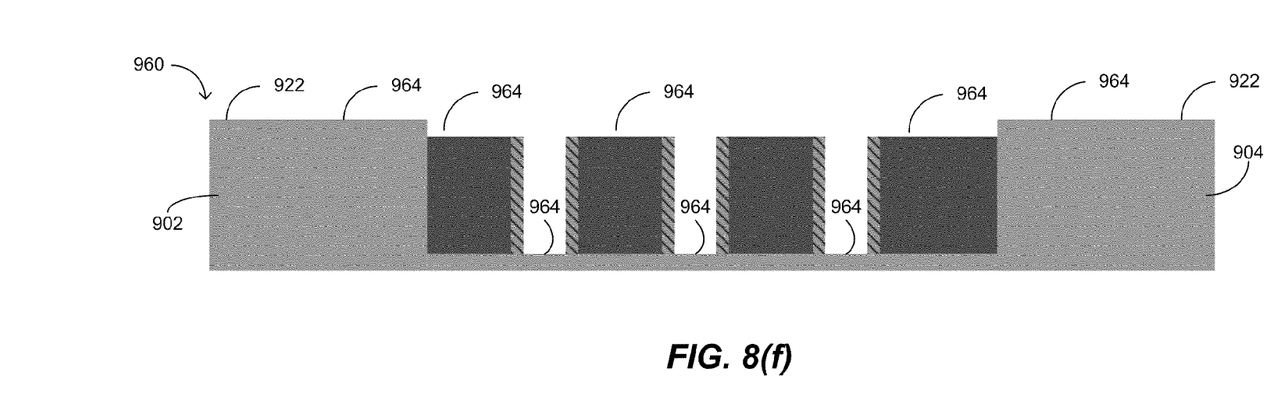

Next, at step 960, an RIE process, or directional milling, is performed to remove the layer 954 located on horizontal surfaces 964 (or x-axis relative to the plane of the page or in parallel with the top surface of the photoresist 942). This is referred to as directional removal because only in the layer 954 on the horizontal surfaces or one direction is removed.

Figure 8G:
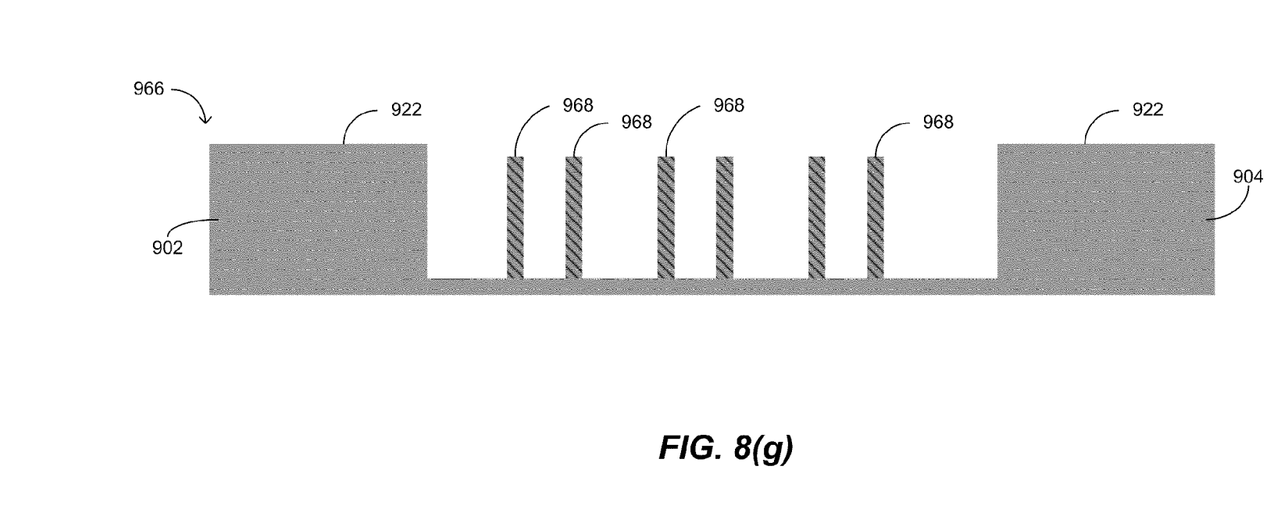

Next, in FIG. 8(g), at step 966, the photoresist 942 is removed by a chemical stripping or dry resist process. What remain between the P1 pedestal layer 902 and the back gap layer 904, in FIG. 8(g), are insulator spacers 968, made of the insulator layer 954, that were located on the side of the photoresist 942, which will become the insulators or spacers between coil turns. The spacers 968 are known to be five times thinner than that developed by conventional damascene techniques. The thickness of the spaces 968 are typically in the range of 50 to 200 nanometers although these values may change with improvements to the processing mechanisms and techniques.

Figure 8H:
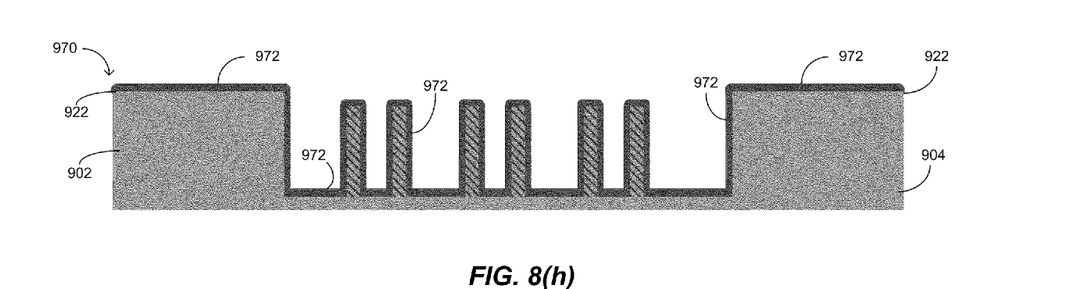

Next, as is done is typical damascene processes, a seed layer 972 is deposited at step 970 in FIG. 8(h) on top of the structure of FIG. 8(g). That is, the top and sides of the P1 pedestal layer 902 and the back gap layer 904, the spaces between the spacers 96, the top and sides of the spacers 968 are all covered with a seed layer. Exemplary material forming the seed layer include but are not limited to Copper, Tantalum Oxide with Copper, or nickel iron (NiFe) with copper.

Figure 8I:
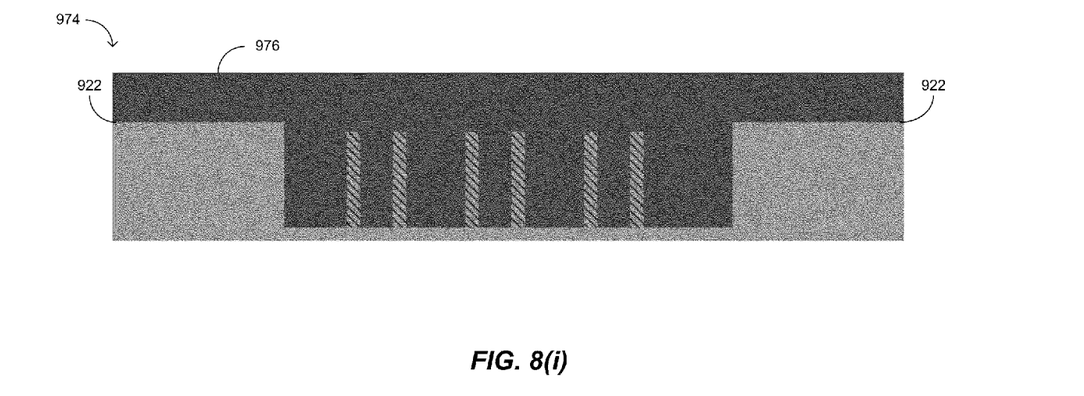

Next, at step 974, in FIG. 8(i), damascene plating is performed to fill and plate up over the foregoing structures. Thus, copper 976, forming the coil, and coil turns in between adjacent spacers 968, is formed at step 974 filling up over and on top of the P1 pedestal layer 902 and the back gap layer 904 and in between the spacers 968.

A damascene process is a process in which metal structures are delineated in dielectrics isolating them from each other not by means of lithography and etching, but by means of CMP. In this process, an interconnect pattern is first lithographically defined in the layer of dielectric, metal is deposited to fill resulting trenches and then excess metal is removed by means of CMP.

Figure 8J:
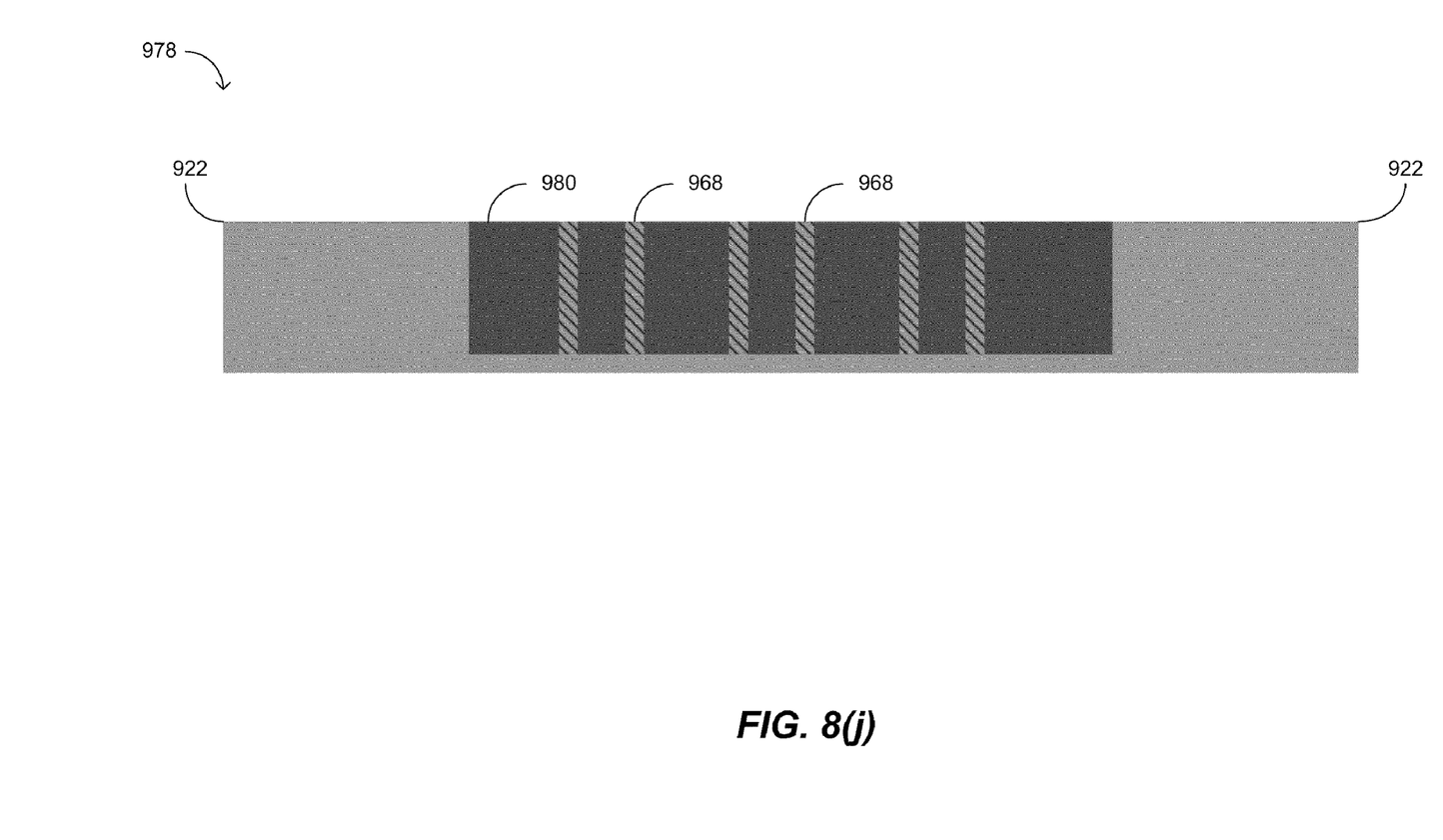

Lastly, in FIG. 8(j), at step 978, polishing is performed using CMP to flatten the surface of the foregoing structures to the height 980. Thus, coil in insulator is created by the foregoing steps and using non-damascene as well as damascene processes to create thin layers of insulation, or spacers, separating coil turns thereby allowing for lower coil resistance leading to reduced write and temperature protrusion.

While the figures referenced herein are not drawn to scale, it remains obvious that that the copper forming a coil or coil turns between the spacers 968 are thick compared to the thickness of the spacers 968, which in one embodiment of the present invention, range anywhere from 10 to 100 nanometers. In one embodiment of the present invention, the spacers 968 are formed of $SiO_2$ or alumina as earlier noted, however, any other suitable material is anticipated. The method and embodiments of the present invention use a thin wall process where the insulators between coil turns are thin causing an increased copper density. While this presents an attractive approach to reducing coil resistance, there is a problem of connecting the coils to force current flow in the same direction. That is, two independent and isolated coil turns are formed in the case where it is used in a conventional single pancake coil, which will be discussed in greater detail in the embodiments to follow.

Figure 9:
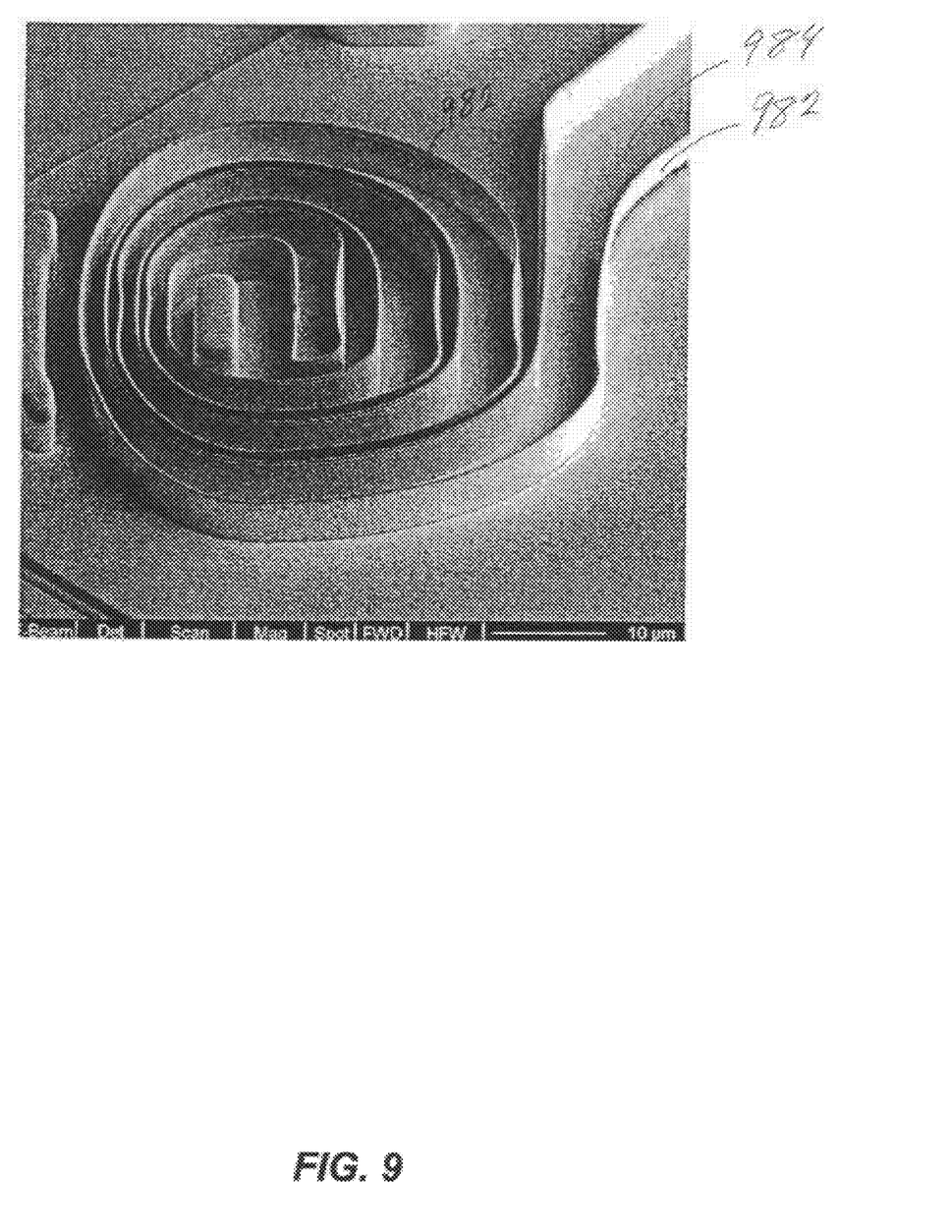
FIG. 9 shows an angular side view of the relevant portions of a coil pattern 984 created in insulator layer or spacers 982 prior to plating and in accordance with another embodiment of the present invention.
Figure 10:
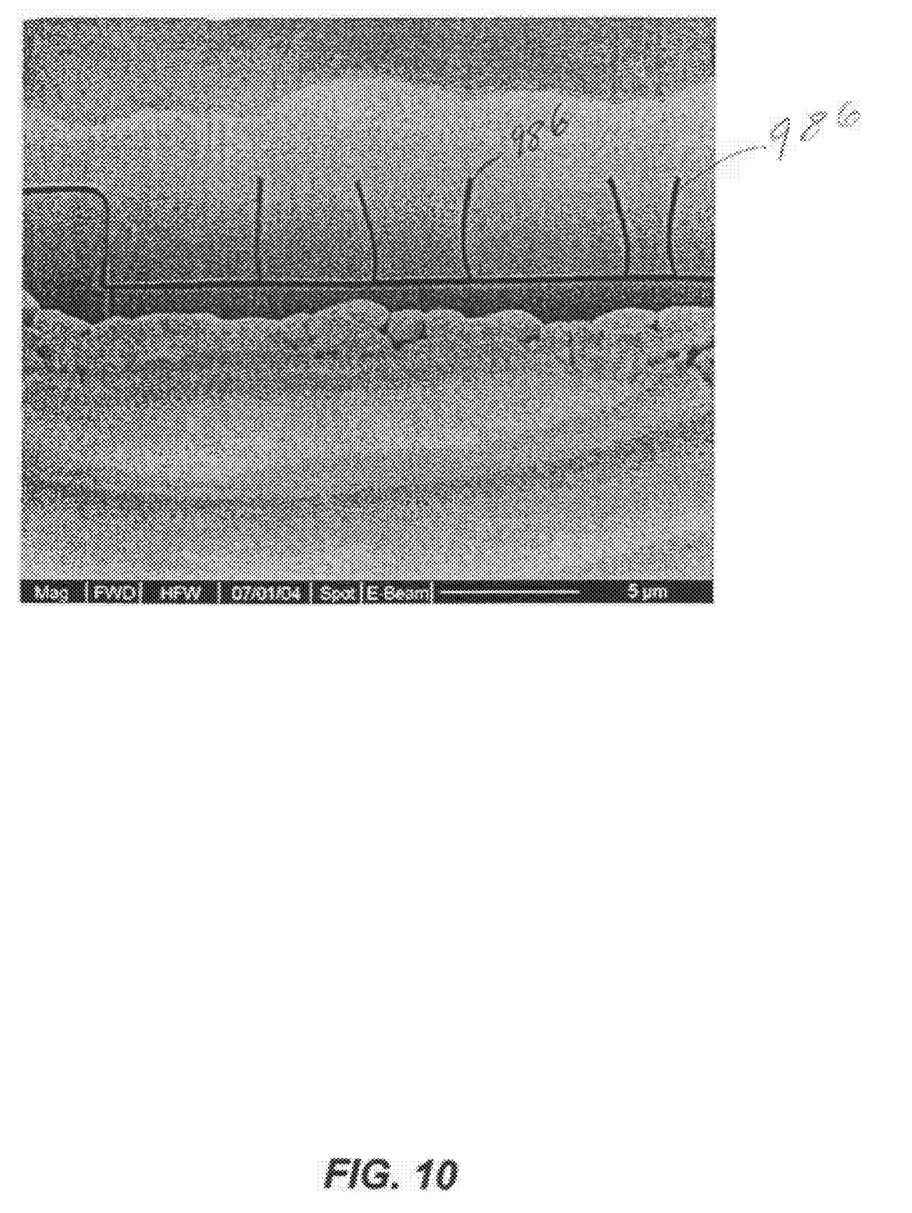
FIG. 10 shows a picture of the coil after plating or after step 974 and shows spacers 986 between coil turns, which slightly bend after damascene processing.

FIG. 9 shows an angular side view of the relevant portions of a coil pattern 984 created in insulator layer or spacers 982 prior to plating and in accordance with another embodiment of the present invention. An exemplary thickness of the spacer 982 is 100 nanometers. The aspect ratio or relative height to thickness ratio of the coil pattern 984 is at least 40:1, which is believed to be significantly greater than the prior art aspect ratio of 5:1. FIG. 10 shows a picture of the coil after plating or after step 974 and shows spacers 986 between coil turns, which slightly bend after damascene processing. The amount of copper is increased by at least a factor of two.

The embodiments of the present invention, as disclosed herein, may be applied to other than write head and can be utilized in any application requiring a small form factor. It has been shown that the form factor using the embodiments and methods of the present invention has reduced form factor by a factor of two.

As noted earlier, the foregoing embodiments of the present invention present an attractive approach to reducing coil resistance, an issue arises because, in the case of a single pancake coil, two independent and isolate coil turns are formed. This results in current flowing in two different directions, which is clearly undesirable. There is therefore a need to force current flow in the same direction while using the process and embodiment disclosed herein. This is particularly true in the case of a single pancake coil design of a write head. In the cases where the coil is a two or more pancake coil design or where the coil design is for a helical coil, there is no need to force current to flow in a single direction because current already does so. In the former case, vias or metal contacts are used to connect the coils and in the case of the latter, the coils formation of coming into and out of the yoke forms a single direction of current flow. Thus, the embodiments that are presented below are suitable for a single pancake coil write head.

Figure 11:
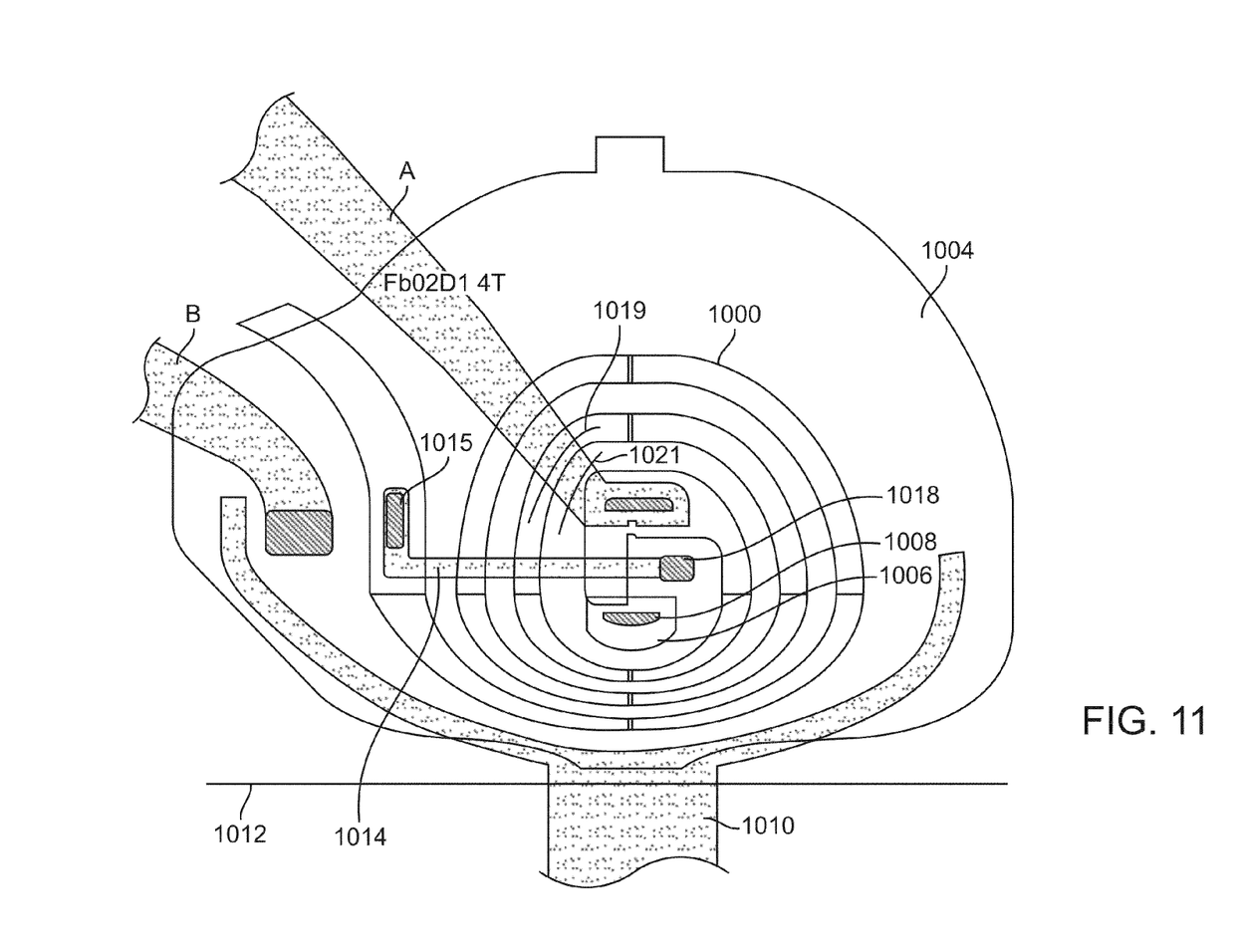
FIG. 11 shows a coil 1000 formed between a P1 pedestal layer 1010 and a back gap layer 1006.

FIG. 11 shows a coil 1000 formed between a P1 pedestal layer 1010 and a back gap layer 1006. The coil 1000 has two coil turns, a first coil turn shown partially at 1019 and a second coil turn shown partially at 1021. The problem is that these two turns are independent of one another without the use of a connector layer.

With continued reference to FIG. 11, a hard bake photoresist 1004 isolates the coil windings of the coil 1000. The coil 1000 includes a center tap 1008 at its inner-most winding and disposed on top of the back gap layer 1006. The P1 pedestal 1010 on top of which the hard bake photoresist 1004 is disposed is shown at an ABS 1012.

A jumper 1014 is shown to couple the center tap 1008 to the outer winding of the coil 1000. The jumper 1014 is a connector layer positioned above the first coil layer. The embodiment of FIG. 11 allows an additional two-coil turn at the same processing step. The jumper 1014 is made of a conductive material and in one embodiment, it is made of copper. The jumper 1014 serves to cause the direction of current to be in one direction, without the jumper 1014, there would be two directions of current in the case where a single pancake coil is used. That is, without the jumper 1014, current would come in at and through A and wind around or circle in a given direction, such as clockwise through the turns of the coil 1000. However, current would also undesirably go around the coil turns of the coil 1000 in the opposite direction, such as counter clockwise thereby creating two directions of current flow. In this manner, the coils act as being in parallel. The jumper 1014 forces current to be in one direction because as the current goes around the coil turns in a given direction, after coming through A, and finds its way to 1015 and then goes back through the jumper 1014 to 1017 and proceeds to go around the coil turns of the coil 1000 in the same direction and leaves through B. In this manner, the coil 1000 acts as being in series.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of forming a coil of a write head comprising:
    forming a P1 pedestal layer;
    forming a back gap layer;
    forming insulator spacers using a non-damascene process by forming a photoresist;
    removing the photoresist, by dry resist processing to form the insulator spacers between the P1 pedestal layer and the back gap layer;
    depositing a seed layer on top and sides of the P1 pedestal layer and the back gap layer and between top and sides of the insulator spacers; and
    forming a coil having coil turns disposed between the insulator spacers using a damascene process.

2. A method of forming a coil, as recited in claim 1, further including the step of depositing a first non-magnetic material into a gap formed between the back gap layer and the P1 pedestal layer.

3. A method of forming a coil, as recited in claim 2, further including the steps of depositing hard bake photoresist to fill the gap and curing the hard baked photoresist.

4. A method of forming a coil, as recited in claim 3, further including the step of polishing using Chemical Mechanical Planarization (CMP) the deposited and cured hard bake photoresist to a height defined by the height of the first non-magnetic, the P1 pedestal layer and the back gap layer.

5. A method of forming a coil, as recited in claim 4, further including the step of forming a coil pattern from the coil having the coil turns.

6. A method of forming a coil, as recited in claim 5, further including the step of depositing an insulator layer over the P1 pedestal layer, the back gap layer, the coil pattern and the photoresist.

7. A method of forming a coil, as recited in claim 6, wherein the insulator layer is conformal.

8. A method of forming a coil, as recited in claim 5, further including the step of removing an insulator layer located on the back gap layer, the P1 pedestal layer, and on a top surface of the photoresist using reactive ion etching (RIE).

9. A method of forming a coil, as recited in claim 6, further including the step of directionally removing an insulator layer located on horizontal surfaces of the back gap layer, the P1 pedestal layer, and a top surface of the photoresist using reactive ion etching (RIE).

10. A method of forming a coil, as recited in claim 1, wherein the removing of the photoresist includes using chemical stripping.

11. A method of forming a coil, as recited in claim 1, further including the step of filling copper between and on top of the spacers and over and on top of the P1 pedestal layer and the back gap layer to form the coil.

12. A method of forming a coil, as recited in claim 11, further including the step of polishing the copper to form the coil using CMP.

13. A method of forming a coil, as recited in claim 1, further including the step of causing coupling of a first coil turn of the coil to a second coil turn of the coil.

* * * * *